United States Patent
Vyas et al.

(10) Patent No.: US 9,326,301 B2
(45) Date of Patent: Apr. 26, 2016

(54) GROUP PROVISIONING OF WIRELESS STATIONS OF A WIRELESS LOCAL AREA NETWORK (WLAN)

(71) Applicant: GainSpan Corporation, San Jose, CA (US)

(72) Inventors: Pankaj Vyas, Bangalore (IN); Prashant Viswanathan, Bangalore (IN); Gregory Alan Winner, San Jose, CA (US)

(73) Assignee: GAINSPAN CORPORATION, San Jose, CA (US)

( * ) Notice: Subject to any disclaimer, the term of this patent is extended or adjusted under 35 U.S.C. 154(b) by 91 days.

(21) Appl. No.: 14/198,595

(22) Filed: Mar. 6, 2014

(65) Prior Publication Data
US 2015/0257176 A1 Sep. 10, 2015

(51) Int. Cl.
| | | |
|---|---|---|
| *H04W 76/00* | (2009.01) | |
| *H04W 8/20* | (2009.01) | |
| *H04W 8/18* | (2009.01) | |
| *H04W 84/12* | (2009.01) | |
| *H04L 12/18* | (2006.01) | |

(52) U.S. Cl.
CPC .............. *H04W 76/002* (2013.01); *H04W 8/20* (2013.01); *H04L 12/189* (2013.01); *H04W 8/186* (2013.01); *H04W 84/12* (2013.01)

(58) Field of Classification Search
None
See application file for complete search history.

(56) References Cited

U.S. PATENT DOCUMENTS

| | | |
|---|---|---|
| 6,487,403 B2 | 11/2002 | Carroll |
| 7,493,127 B2 | 2/2009 | Morgan |
| 7,616,594 B2 | 11/2009 | Roberts |
| 2012/0052876 A1* | 3/2012 | Anderson et al. .......... 455/456.1 |
| 2013/0040576 A1 | 2/2013 | Yoon |
| 2013/0198274 A1 | 8/2013 | Papakipos |
| 2013/0272164 A1* | 10/2013 | Leonardos et al. .......... 370/254 |
| 2013/0288601 A1 | 10/2013 | Chhabra |
| 2014/0226817 A1* | 8/2014 | Von Huben et al. .......... 380/270 |

FOREIGN PATENT DOCUMENTS

| | | |
|---|---|---|
| EP | 1876759 B1 | 9/2010 |
| WO | 2007005030 A3 | 12/2007 |

OTHER PUBLICATIONS

"Smartpass Connect", http://www.juniper.net/us/en/local/pdf/datasheets/1000412-en.pdf, juniper Networks, Inc. Dated: copyright 2012, pp. 1-59.

(Continued)

*Primary Examiner* — Diane Lo
(74) *Attorney, Agent, or Firm* — IPHorizons PLLC; Narendra Reddy Thappeta (57) ABSTRACT

An aspect of the present disclosure enables convenient provisioning of multiple wireless devices. In an embodiment, a provisioning agent (e.g., a smart phone) identifies wireless devices requiring provisioning to operate as wireless stations and communicates with each wireless device to provide provisioning parameters for joining a first basic service set (BSS). However, during such communication, the provisioning agent operates as a wireless station and each wireless device operates as an access point (AP) outside of the first BSS. Each wireless device is enabled to be configured according to the received provisioning parameters to thereafter operate as a corresponding wireless station of the first BSS.

18 Claims, 5 Drawing Sheets

(56) References Cited

OTHER PUBLICATIONS

"Simply Connected", http://community.westcongroup.com/serylet/JiveServlet/downloadBody/5567-102-1-10117/Juniper_SimplyConnectedDemo_WestconTLS%2022%20janv%202013.pdf, juniper Networks, Inc., Dated: Dec. 2012, pp. 1-4.

Kim, I. Yeungnam Univ., Gyeongsan, South Korea; Young-Tak Kim, "Prediction-based smart channel scanning with minimized service disruption for IEEE 802.11e WLAN", Consumer Electronics, IEEE Transactions on (vol. 57, Issue: 2 ), Dated: May 2011, p. 1.

Raza, M. ; Kggdc, Karachi, Pakistan ; Hyder, S.I., "A forced routing information modification model for preventing black hole attacks in wireless Ad Hoc network", Applied Sciences and Technology (IBCAST), 2012 9th International Bhurban Conference on Jan. 9-12, 2012, pp. 1-2.

Shudong Chen ; Dept. of Math. & Comput. Sci., Eindhoven Univ. of Technol., Eindhoven ; Lukkien, J., "Secure Resource Control in Service Oriented Applications",Consumer Communications and Networking Conference, 2009. CCNC 2009. 6th IEEE, Dated: Jan. 10-13, 2009 , p. 1.

\* cited by examiner

GROUP PROVISIONING OF WIRELESS STATIONS OF A WIRELESS LOCAL AREA NETWORK (WLAN)

BACKGROUND

1. Technical Field

Embodiments of the present disclosure relate generally to wireless networks, and more specifically to provisioning of multiple wireless stations of a WLAN.

2. Related Art

A Wireless Local Area Network (WLAN) contains an access point (AP) and one or more wireless stations. An AP refers to a switching device, which receives packets from a wireless station and forwards the packet to or towards a target device. A wireless station on the other hand is the source or destination in the WLAN of such packets. The target (or destination) device is often another wireless station in the same wireless network, though it can be a device connected through a wired network via the access point. The access point communicates with the wireless devices using protocols such as those defined according to IEEE 802.11 standard.

A wireless station generally needs to be provisioned before being able to communicate with other stations via an AP implementing various security measures. Provisioning generally entails configuring (e.g., storing at appropriate locations) the wireless station with various parameters that enable the wireless station to comply with the security measures enforced by the AP. In many WLAN environments, the parameters include SSID (Service set identification) of the network and a passphrase, as is well known in the relevant arts.

There are often situations when multiple wireless stations are to be provisioned. For example, a user may purchase multiple WLAN capable stations for home use, and thereafter wish that all these stations be enabled to communicate via a pre-existing AP installed at home. It may be desirable that the user be facilitated to provision all such stations with as little overhead as possible.

BRIEF DESCRIPTION OF THE VIEWS OF DRAWINGS

Example embodiments of the present disclosure will be described with reference to the accompanying drawings briefly described below.

In the drawings, like reference numbers generally indicate identical, functionally similar, and/or structurally similar elements. The drawing in which an element first appears is indicated by the leftmost digit(s) in the corresponding reference number.

DETAILED DESCRIPTION

1. Overview

An aspect of the present disclosure enables convenient provisioning of multiple wireless devices. In an embodiment, a provisioning agent (e.g., a smart phone) identifies wireless devices requiring provisioning to operate as wireless stations and communicates with each wireless device to provide provisioning parameters for joining a first basic service set (BSS). However, during such communication, the provisioning agent operates as a wireless station and each wireless device operates as an access point (AP) outside of the first BSS. Each wireless device is enabled to be configured according to the received provisioning parameters to thereafter operate as a corresponding wireless station of the first BSS.

According to another aspect of the present disclosure, the group of wireless devices which are candidates requiring provisioning are determined based on a convention employed with respect to the SSID value used in communication between the wireless device and the provisioning agent operating as an wireless station outside of the first BSS. Thus, a manufacturer/vendor of wireless devices may need to configure the wireless devices to operate as APs, with the corresponding convention for SSID value, to facilitate convenient provisioning in accordance with features of the present disclosure.

According to yet another aspect of the present disclosure, a convenient user interface is provided for a user of the provisioning agent, using which the user is displayed a list of devices requiring provisioning. The user may select the desired set of devices from the list and thereafter initiate configuration of the selected devices. Communication may be initiated with the wireless devices sequentially to configure each device as a wireless station. The provisioning agent may further communicate with the configured wireless station, as a basis for providing a report indicating which of the devices are successfully provisioned (and thus operating as wireless station of the first BSS).

Several aspects of the disclosure are described below with reference to examples for illustration. It should be understood that numerous specific details, relationships, and methods are set forth to provide a full understanding of the disclosure. One skilled in the relevant arts, however, will readily recognize that the disclosure can be practiced without one or more of the specific details, or with other methods, etc. In other instances, well-known structures or operations are not shown in detail to avoid obscuring the features of the disclosure.

2. Example Environment

Figure 1:
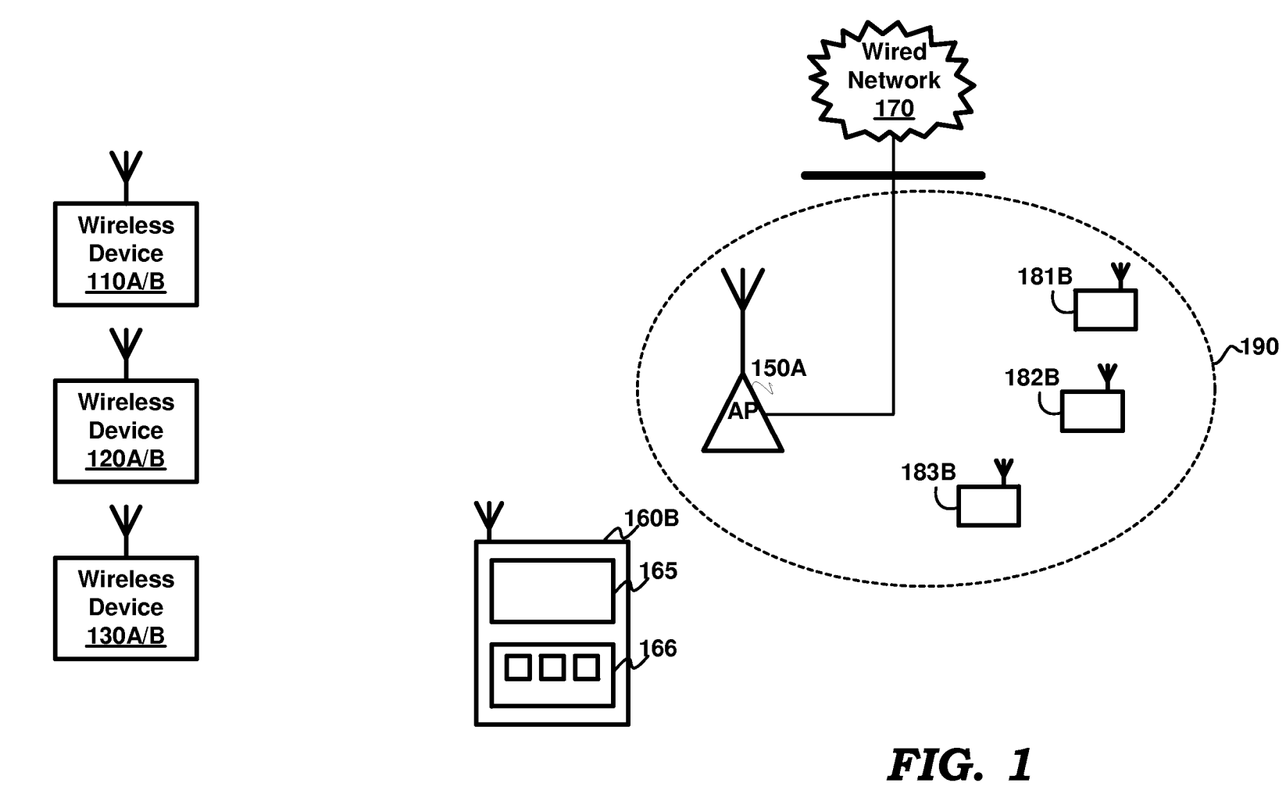
FIG. 1 is a block diagram representing an example environment in which several aspects of the present disclosure can be implemented.

FIG. 1 is a block diagram representing an example environment in which several aspects of the present disclosure can be implemented. The example environment is shown containing only representative systems for illustration. However, real world environments may contain more or fewer systems. FIG. 1 is shown containing wireless devices 110A/B, 120A/B and 130A/B, provisioning agent 160B, wired network 170, and BSS (basic service set) 190. BSS 190 in turn is shown containing access point (AP) 150A, wireless stations 181B/182B and 183B.

It may be appreciated that a wireless device operating as an access point is shown with a reference numeral having a suffix of A, while a wireless device operating as a wireless station is shown with a reference numeral having a suffix of B. When a device is enabled to operate as either a wireless station or an AP, that device is shown with reference numeral having a suffix of A/B. The specific durations in which such a device operates as a wireless station and those in which it operates as a AP, will be clear from the description below.

BSS 190 represents a basic service set (BSS) consistent with the IEEE 802.11 standard(s). As may be appreciated, each BSS is characterized by a corresponding SSID (service set identifier). Thus, AP 150A and wireless stations 181B-183B are operative as a single BSS, based on a single SSID. Several devices (160B, 110A/B, etc.) are shown outside of BSS 190, implying at least that such devices would not be operating as a part of the WLAN defined by AP 150A. Wired network 170 represents an external network using which devices outside of BSS 190 can be accessed (by wireless stations of BSS 190), in a known way.

Wireless devices 110A/B, 120A/B and 130A/B represent devices that are capable of communicating wirelessly according to IEEE 802.11 standards. Each of wireless devices 110 and 120 may have a core functionality (e.g., operation as a smart meter, sensor, etc), and the wireless communication capability according to IEEE 802.11 can be used to communicate various data and control parameters of interest with other devices via an AP (for example, AP 150A). However, before wireless devices 110A/B and 120A/B can perform such communication, the wireless devices 110A/B and 120A/B may need to be provisioned.

Provisioning agent 160B may correspond to a device such as a smart phone, having display screen 165 and input mechanism 166 (e.g., keypad). Provisioning agent 160B provided according to aspects of the present disclosure provisions each of the wireless devices 110A/B, 120A/B and 130A/B such that each device can thereafter operate as a corresponding wireless station within BSS 190, as described below with examples.

3. Group Provisioning of Multiple Wireless Devices

Figure 2:
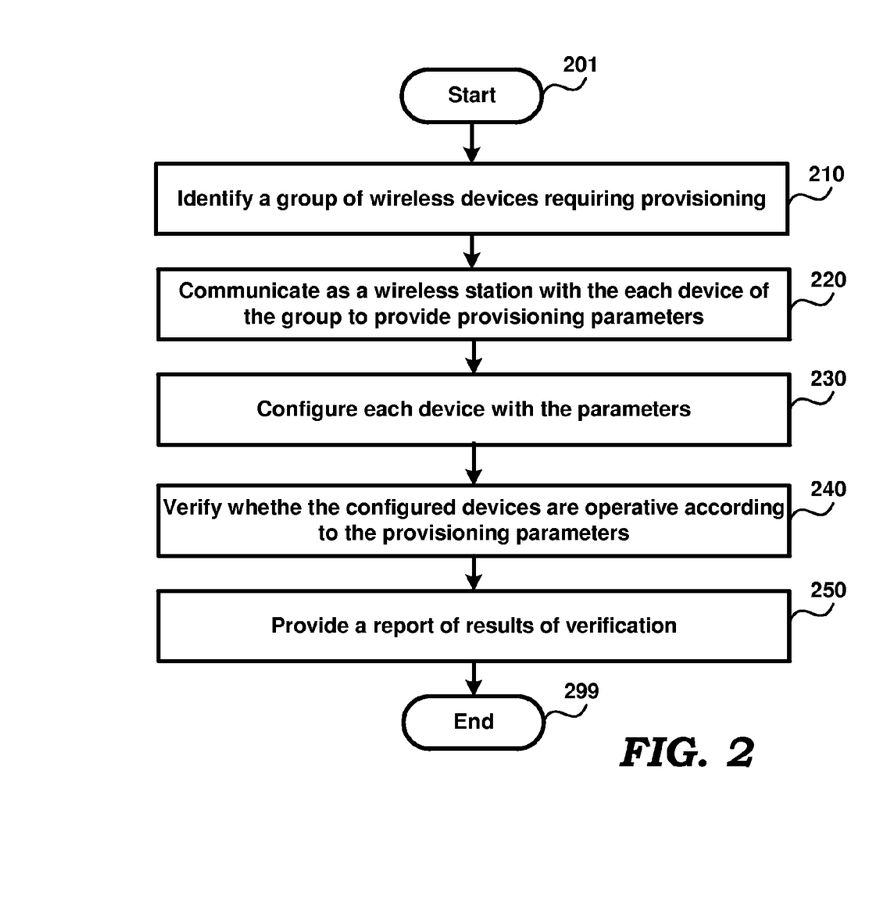
FIG. 2 is a flowchart illustrating the manner in which multiple wireless devices can be conveniently provisioned, in an embodiment.

FIG. 2 is a flowchart illustrating the manner in which multiple wireless devices can be conveniently provisioned, in an embodiment. The flowchart is described with respect to the environment of FIG. 1, merely for illustration. However, various features described herein can be implemented in other environments and using other components as well, as will be apparent to one skilled in the relevant arts by reading the disclosure provided herein.

Further, the steps in the flowchart are described in a specific sequence merely for illustration. Alternative embodiments using a different sequence of steps can also be implemented without departing from the scope and spirit of several aspects of the present disclosure, as will be apparent to one skilled in the relevant arts by reading the disclosure provided herein. The flowchart starts in step 201, in which control passes immediately to step 210.

In step 210, provisioning agent 160B identifies a group of wireless devices requiring provisioning. In an embodiment, only those wireless devices (operating as APs) using a pre-defined text (e.g., of the form 'Device-XX-Needs-Provisioning', where XX represents an identifier of the device) in the SSID field (as shown in packet 300 of FIG. 3) are deemed to be members of the group.

Figure 3:
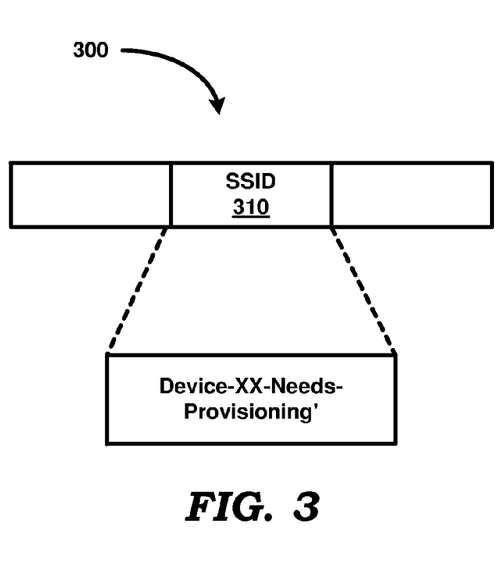
FIG. 3 depicts the format of a packet used for group provision, in an embodiment.

The identification may be based on receipt of a beacon in accordance with 802.11 standards from wireless device 110A, with the beacon containing the SSID 310 in accordance with FIG. 3. However, such beacons may consume power in wireless devices requiring provisioning, and thus be undesirable.

Alternatively (or in addition), provisioning agent 160B sends a probe request (with a pre-defined text, e.g., 'Need Provisioning?', in SSID field), and the responding wireless devices may be included in the group. As the wireless devices to be configured need not proactively transmit beacon type messages, wireless devices may be operated with minimal power requirement.

In step 220, provisioning agent 160B communicates as a wireless station with each device of the group to provide corresponding provisioning parameters to the respective one of the devices. The same SSID and passphrase may be communicated to all the wireless devices, assuming all such devices are to be part of the same pre-existing BSS 190. In this step, the provisioning agent 160B may also make a note of the unique identifier of each device.

In step 230, each device is configured with the corresponding parameters such that the device can thereafter operate as a wireless station. Such configuration may merely entail storing of the received values at the appropriate memory locations and ensuring the device thereafter operates with the functions of a wireless station. Assuming successful configuration, the corresponding device may thereafter operate as a wireless station in BSS 190.

In step 240, provisioning agent 160B verifies whether the configured devices are operative according to the provisioned parameters. Operation in accordance with the intended configuration implies that the wireless station has associated with AP 150A of BSS 190 in accordance with 802.11 protocol. The association can be confirmed using any of the approaches, as suitable in the corresponding environments. The unique identifier noted in step 220 may be used for the confirmation procedure.

In step 250, provisioning agent 160B provides a report of results of verification. The report may indicate the specific devices which are verified to be operative according to the configuration, and those that could not be verified. The flow chart ends in step 299.

Thus, as the members of the group can be identified according to any desired convention, and as the members of the group can thereafter be configured with utmost minimal user intervention (or no user intervention), provisioning of multiple devices together may be simplified.

The features noted above can be implemented in various embodiments of provisioning agent 160B and wireless devices 110A/B, 120A/B, and 130A/B. The description is continued with respect to the details of a wireless device and then a provisioning agent 160B, consistent with the implementation of the wireless device.

4. Wireless Device

Figure 4:
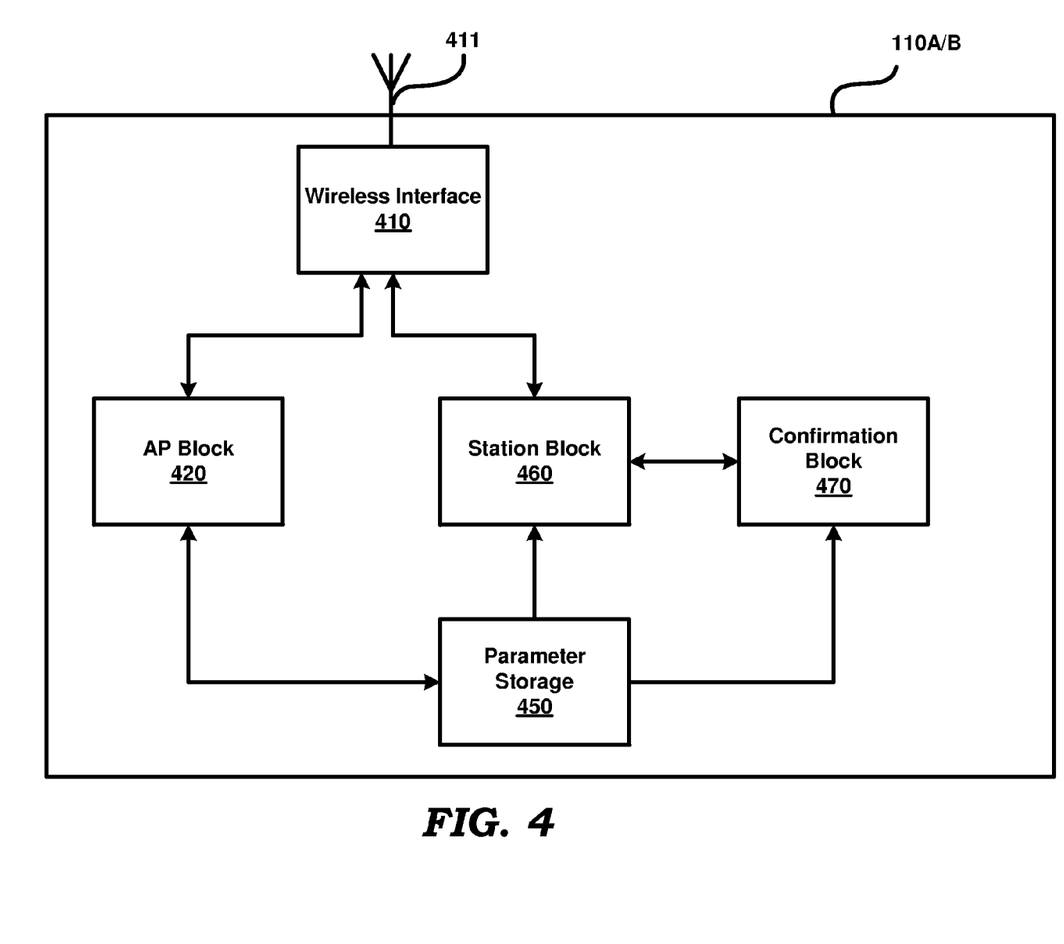
FIG. 4 is a block diagram of the internal details of a wireless device provisioned according to an aspect of the present disclosure.

FIG. 4 is a block diagram illustrating the internal blocks of wireless device, in an embodiment. Wireless device 110A/B is shown containing wireless Interface 410, AP Block 420, parameters storage 450, station block 460, and confirmation block 470. Each block is described below in further detail.

Wireless interface 410 represents the combination of hardware, software and firmware components that enable wireless device 110A/B to communicate wirelessly (via antenna 411) according to IEEE 802.11 standards. Wireless interface 410 transmits packets received from any of the internal blocks 420/460 and delivers received packets to appropriate one of the internal blocks, in a known way.

Parameter storage 450 contains non-volatile memory for storing various parameters. One parameter (mode parameter) may indicates whether the device 110A/B is already configured as a wireless station or not. Assuming that such a parameter indicates that the device 110A/B is configured as a wireless station, the corresponding security credentials received from provisioning agent 160B, are also stored in parameter storage 450. If the parameter indicates the device 110A/B is not yet configured as a wireless station, some of the other parameters provide SSID and other parameters (e.g., Channel information), which are required for device 110A/B to operate as an AP outside of BSS 190. Parameter storage 450 may also store a parameter (id parameter), which uniquely identifies wireless device 110A/B.

Access Point (AP) block 420 represents the combination of hardware, software and firmware components that enable wireless device 110A/B to power-up as an access point, when parameters storage 450 indicates that the device 110A/B is not yet configured as a wireless station. AP block 420 may communicate with each wireless device based on the SSID and other parameters available in parameter storage 450 to receive provisioning parameters to operate in BSS 190. AP block 420 stores the received parameters in appropriate locations of parameter storage 450 to cause device 110A/B be configured as a wireless station of BSS 190. AP block 420 operates in "No Security" mode which implies that any wireless station can establish Layer 2 connectivity with the device without requiring any credentials.

As noted above briefly, AP block 420 may send periodic beacon messages, containing pre-defined SSID value indicating that the wireless device requires provisioning. Alternatively (or in addition), AP block 420 responds to probe requests with a pre-defined SSID. In either case, provisioning agent 160B (operating as a wireless station) associates with wireless device 110A operating as an access point (AP). AP block 420 may form a unique identifier (based on at least a part of MAC address) for device 110A/B, which is stored as id parameter in parameter storage 450 and communicated to provisioning agent 160B while requesting the provisioning parameters. Once the provisioning parameters are successfully received and stored, AP block 420 may set a parameter of parameter storage 450, to indicate that device 110A/B is to thereafter operate as a wireless station.

Station block 460 represents the combination of hardware, software and firmware components that enables wireless device 110B to operate as a wireless station. As may be appreciated from the description above, station block 460 is operative only when the parameters of parameter storage 450 indicate that device 110A/B is to operate as wireless station. Station block 460 retrieves the requisite configuration parameters from parameters storage 450 to associate with access point 150A. Once associated with access point 150A, wireless device operates as wireless station of BSS 190.

Confirmation block 470 operates to confirm the successful provisioning of wireless device 110A/B. In an embodiment, confirmation block 470 is designed to examine packets of a specific multicast address, and respond back to the sender with the identity of the wireless station (i.e., the unique identifier noted above). The specific IP multicast address and port number may be that corresponding to mDNS/DNS-SD technologies (RFC 6762 and 6763). Confirmation block 470 may accordingly be implemented in accordance with mDNS/DNS-SD and extended to respond to the request for the unique identifier (specified in the corresponding mDNS packet). Accordingly, sending back the unique identifier implies that the device 110A/B is successfully configured to be part of BSS 190 (in view of reception of mDNS packet).

The description is continued with respect to details of provisioning agent 160B in an embodiment.

5. Provisioning Agent

Figure 5:
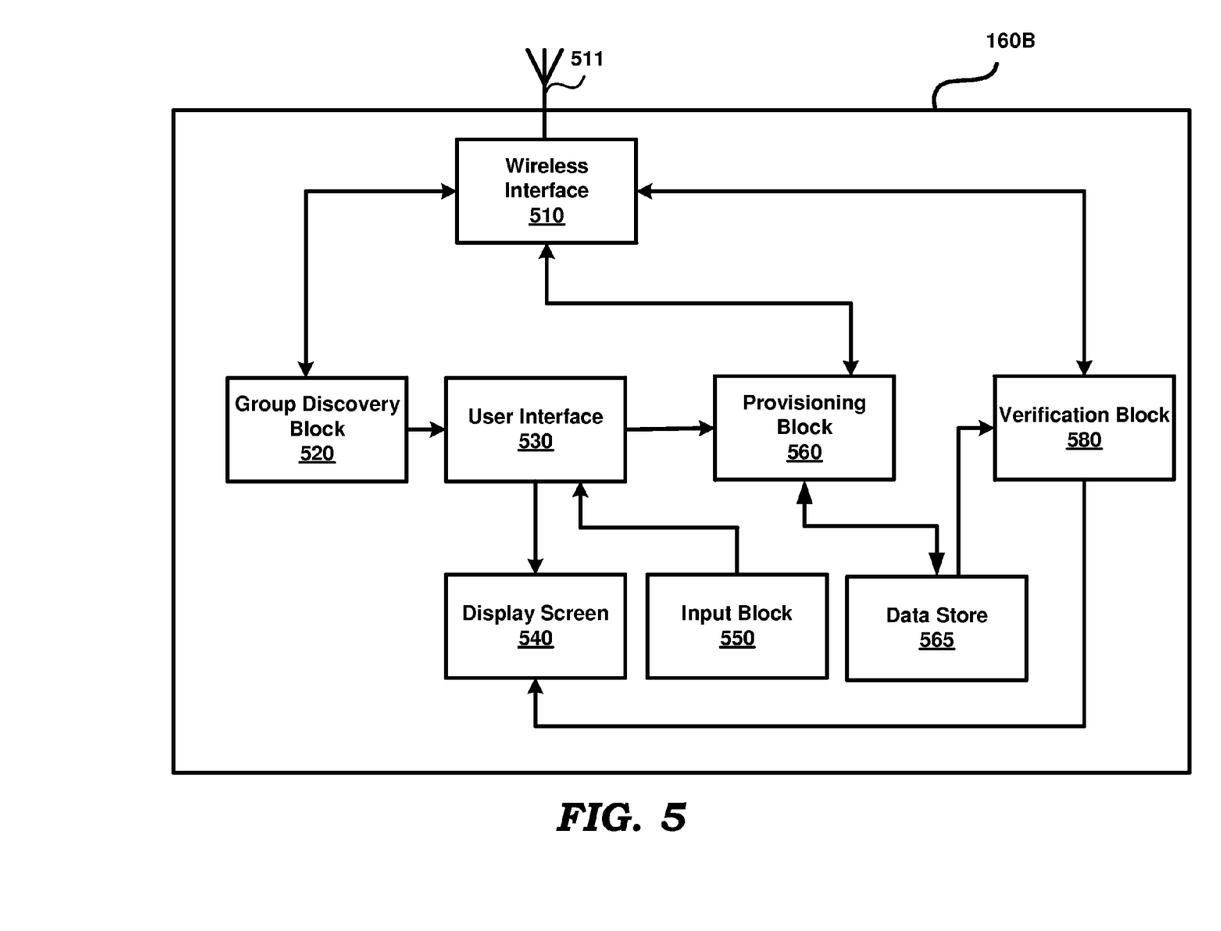
FIG. 5 is a block diagram illustrating the details of a provisioning agent, in an embodiment.

FIG. 5 is a block diagram illustrating the internal blocks of provisioning agent 160B, in an embodiment. Provisioning agent 160B is shown containing wireless interface 510, group discovery block 520, user interface 530, display screen 540, input block 550, provisioning block 560, data store 565, and verification block 580

Wireless interface 510 represents the combination of hardware, software and firmware components that enable provisioning agent 160B to communicate wirelessly (via antenna 511) according to IEEE 802.11 standards. Wireless interface 510 may be implemented in a known way.

Group Discovery block 520, identifies/discovers a group of wireless devices requiring provisioning. The identification may be based on receipt of a beacon messages containing the SSID 310 in accordance with FIG. 3. Alternatively (or in addition), provisioning agent 160B sends a probe request (with a pre-defined text, e.g., 'need provisioning?', in SSID field) and wireless device sends response. Group Discovery block 520 scans all messages received from wireless devices and then filters them based on SSID pattern. For example, wireless devices sending messages containing SSID in the form of 'Device-XX-Needs-Provisioning' are identified. In other words, if a packet is received without such an SSID, the corresponding wireless device may not be included in the list. The list of identified wireless devices is sent to user interface 530.

User interface 530 displays the received list on display screen 540. A user can view the list of identified/discovered devices, and using input block 550, user can further select only those of the devices s/he wishes to provision in accordance with the present disclosure. The displayed information may include various identification information (e.g., unique identifier noted above) of the wireless devices to facilitate the user to select only those devices that are of interest. Input block 550 may correspond to input components such as keypad (166 of FIG. 1) or touch screen capability.

Provisioning block 560 provides provisioning parameters to each of the selected wireless devices in sequential fashion. Provisioning block 560 connects with each wireless device 110A/B using a secure transport layer protocol (e.g. HTTPS or SSL over TCP) via wireless interface 510 and sends provisioning parameters stored inside data store 565 over the secured channel. The provisioning parameters may include SSID (Service Set Identifier), Security Type to be used, any required Security Credentials (e.g., Passphrase for WPA or WPA2 Personal security, WEP key when secured with WEP) in accordance with 802.11 protocol. Provisioning block 560 also receives unique identifier of each wireless device and stores the same in data store 565.

Data store 565 contains both volatile (random access) and non-volatile hardware components. The non-volatile component may be used for storing the provisioning parameters (security credentials) to be sent to each wireless device, in addition to the unique identifier for each wireless device.

Verification block 580 operates to check whether each wireless device attempted to be configured, has in fact been successfully configured. Any cooperative approach with confirmation block 470 can be used. In an embodiment, verification block 580 operates to cause provisioning agent 160B to become a wireless station of BSS 190, and then send a IP multicast packet of a specific multicast IP destination address on BSS 190 (via AP 150A) in accordance with mDNS/DNS- SD technologies (described in RFC 6762 and 6763). The multicast packet is designed to include content requesting each end recipient (wireless station 110B, 120B, 130B) to respond back with its unique identifier. The received identifier is thereafter compared with the list of unique identifiers compiled as part of step 220 (para 029) to perform the verification.

As noted above, data store 565 contains record of the list of wireless devices attempted to be configured. Accordingly, the list of responding devices with the appropriate response (indicating that the wireless station is associated with AP 150A) is compared with the list of data store 565. A suitable report is generated (indicating which devices are successfully confirmed to have joined BSS 190) and displayed on display screen 540 (corresponding to screen 165 of FIG. 1).

Though each of provisioning agent 160B and wireless device 110A/B is described above with respect to block diagrams, the features described can be operative by execution of appropriate executable modules within the corresponding device/agent. The description is continued with respect to such a digital processing system.

6. Digital Processing System

Figure 6:
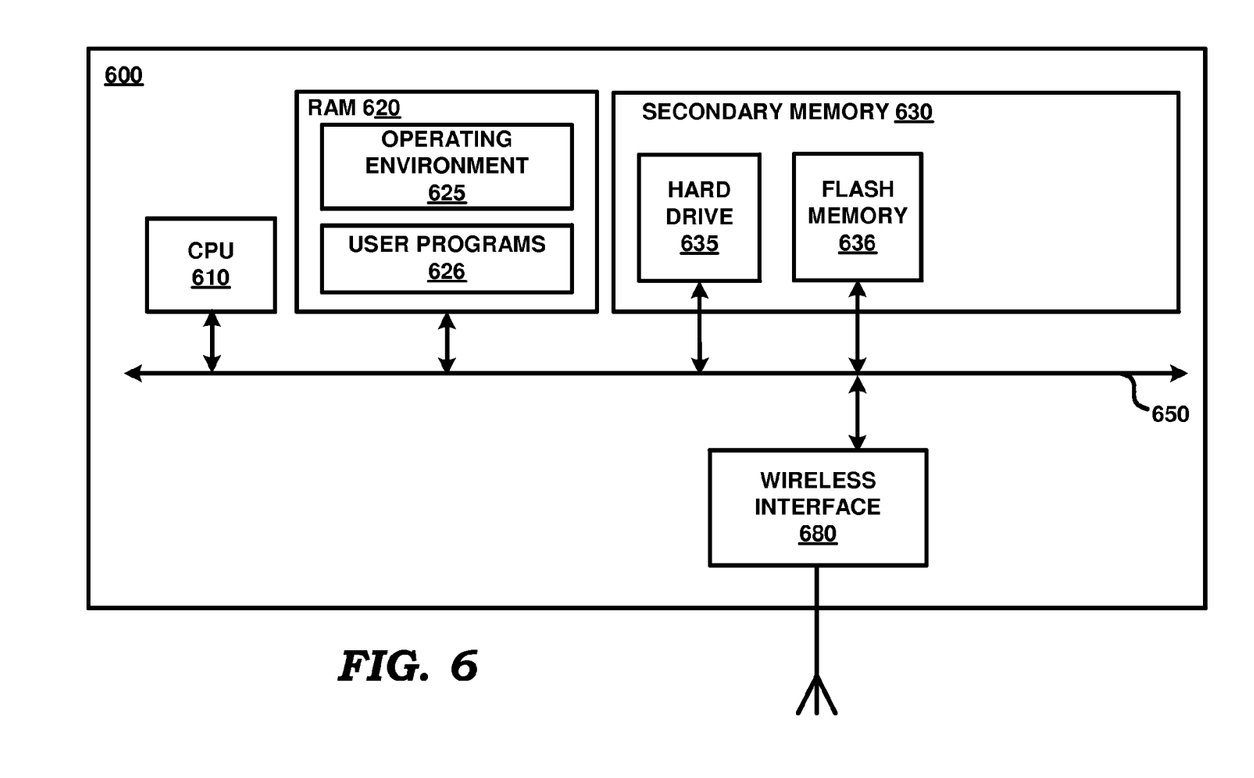
FIG. 6 is a block diagram illustrating the details of a wireless device in an embodiment in which various aspects of the present disclosure are operative by execution of appropriate executable modules.

FIG. 6 is a more detailed block diagram illustrating the details of digital processing system 600, in which several aspects of the present disclosure are operative by execution of appropriate executable modules. System 600 can correspond to either provisioning agent 160B or wireless device 110A/B.

System 600 may contain one or more processors such as a central processing unit (CPU) 610, random access memory (RAM) 620, secondary memory 630, and wireless interface 680. All the components may communicate with each other over communication path 650, which may contain several buses as is well known in the relevant arts.

CPU 610 may execute instructions stored in RAM 620 to provide several features of the present disclosure. CPU 610 may contain multiple processors, with each processor potentially being designed for a specific task. Alternatively, CPU 610 may contain only a single general-purpose processor. Such combination of one or more processors may be generally referred to as a processing unit. Wireless interface 680 corresponds to wireless interface 410 and 510 of wireless device 110A/B and provisioning agent 160B respectively.

RAM 620 may receive instructions from secondary memory 630 (non-transitory/non-volatile machine readable storage medium) via communication path 650. RAM 620 is shown currently containing software instructions constituting operating environment 625 and/or other user programs 626. In addition to operating system, RAM 620 may contain other software programs such as device drivers, etc., which provide a (common) run time operating environment 625 for execution of code/programs/applications (in the form of execution entities) represented as user programs 626.

Secondary memory 630 is shown containing hard drive 635 and flash memory 636. Secondary memory 630 stores data and software instructions (code), which enable wireless devices to operate in accordance with the features described above. The software instructions (and additionally data) may either be copied to RAM 620 prior to execution by CPU 610, or may be executed directly from flash memory 636.

The term "storage media/medium" as used herein refers to any non-transitory media that stores data and/or instructions that cause a machine to operate in a specific fashion. Such storage media may comprise non-volatile media and/or volatile media. Non-volatile media includes, for example, optical disks, magnetic disks, or solid-state drives, such as secondary memory 630. Volatile media includes dynamic memory, such as RAM 620. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 650. Transmission media can also take the form of acoustic or light waves, such as those generated during radio-wave and infra-red data communications.

7. Conclusion

References throughout this specification to "one embodiment", "an embodiment", or similar language means that a particular feature, structure, or characteristic described in connection with the embodiment is included in at least one embodiment of the present disclosure. Thus, appearances of the phrases "in one embodiment", "in an embodiment" and similar language throughout this specification may, but do not necessarily, all refer to the same embodiment.

While various embodiments of the present disclosure have been described above, it should be understood that they have been presented by way of example only, and not limitation. Thus, the breadth and scope of the present disclosure should not be limited by any of the above-described embodiments, but should be defined only in accordance with the following claims and their equivalents.

What is claimed is:

1. A method of provisioning multiple wireless devices, said method being performed in a provisioning agent, said method comprising:
   identifying a plurality of wireless devices requiring provisioning to operate as wireless stations;
   communicating with each of said plurality of wireless devices to provide provisioning parameters for joining a first basic service set (BSS), wherein said first BSS is characterized by a first service set identifier (SSID) identifying said first BSS, wherein said provisioning parameters contain said first SSID,
   wherein said provisioning agent operates as a wireless station and each of said plurality of wireless devices operates as an access point (AP) outside of said first BSS during said identifying and said communicating,
   wherein each of said plurality of wireless devices is enabled to be configured according to the received provisioning parameters including said first SSID such that each of said plurality of wireless devices thereafter joins said first BSS based on said first SSID and operates as a corresponding wireless station of said first BSS.

2. The method of claim 1, wherein said communicating is performed only after all of said plurality of wireless devices are identified.

3. The method of claim 2, wherein said method further comprises:
   verifying whether or not each of said plurality of wireless devices are operating as wireless stations of said first BSS; and
   reporting results of said verification to a user.

4. The method of claim 2, wherein said verifying comprises:
    sending a multi-cast packet to a multicast address in the first BSS, wherein said multi-cast packet is designed to enquire a unique identifier of each recipient wireless station in said first BSS; and
    receiving as a response, from each wireless station that is part of the first BSS, said response containing the unique identifier of the wireless station.

5. The method of claim 4, wherein said multi-cast is according to multicast Domain Name Service/Domain Name Service-Service Discovery (mDNS/DNS-SD) protocols, wherein said provisioning parameters further comprise a passphrase required to associate with said AP, wherein said provisioning parameters are communicated on a secure channel established between said provisioning agent and corresponding wireless device.

6. The method of claim 2, wherein said identifying forms a superset of wireless devices requiring provisioning, said method further comprising:
    displaying said superset of wireless devices to a user; and
    receiving inputs from said user indicating that only said plurality of wireless devices of said superset of wireless devices are selected for configuration by said user,
    wherein said superset of wireless devices displayed to said user contains a first device that is not contained in said plurality of wireless devices,
    wherein said communicating does not communicate with said first wireless device in view of said inputs not indicating said first wireless device as being selected by said user.

7. The method of claim 6, said identifying further comprises:
    receiving a respective beacon message from a corresponding wireless device;
    examining a SSID contained in said beacon message for a pre-specified pattern; and
    including the corresponding wireless device in said superset only if the SSID matches the pre-specified pattern.

8. The method of claim 6, said identifying further comprises:
    transmitting a probe request with a broadcast SSID;
    receiving a probe response from a corresponding wireless device;
    examining a SSID contained in said probe response for a pre-specified pattern; and
    including the corresponding wireless device in said superset only if the SSID matches the pre-specified pattern.

9. A non-transitory machine readable storage medium storing one or more sequences of instructions for provisioning a wireless device, wherein execution of said one or more sequences of instructions by one or more processors contained in said wireless device enables said wireless device to perform the actions of:
    powering-up as an access point in accordance with 802.11 standards;
    sending by said wireless device to a provisioning agent, a packet indicating that said wireless device requires provisioning for joining a first basic service set (BSS), wherein said first BSS is characterized by a first service set identifier (SSID) identifying said first BSS;
    associating with said provisioning agent;
    receiving provisioning parameters from said provisioning agent, wherein said provisioning parameters contain said first SSID, wherein said provisioning agent operates as a wireless station in accordance with 802.11 standards upon said associating and during said receiving, said wireless device operating as said access point during said associating and said receiving;
    storing said provisioning parameters in pre-specified memory locations in said wireless device;
    joining said first BSS based on said first SSID; and
    operating as a wireless station of said first basic service set (BSS) specified by said provisioning parameters after said storing.

10. The non-transitory machine readable medium of claim 9, wherein said packet is a beacon message containing another service set identifier (SSID) of a pre-defined pattern.

11. The non-transitory machine readable medium of claim 9, wherein said packet is a response to a probe request received from said provisioning agent.

12. The non-transitory machine readable medium of claim 9, further comprising:
    communicating an identifier to said provisioning agent while being associated with said provisioning agent;
    storing said identifier in a non-volatile memory provided in said wireless device;
    receiving a multicast packet requesting said identifier, said multicast packet being received during said operating as said wireless station of said first BSS; and
    sending said identifier as a response to said multicast packet, wherein said response confirms that said wireless device is configured to operate as said wireless station in said first BSS.

13. The non-transitory machine readable medium of claim 12, wherein said multicast packet is according to multicast Domain Name Service/Domain Name Service-Service Discovery (mDNS/DNS-SD).

14. A wireless device comprising:
    a memory to store instructions;
    a processing unit to retrieve and execute said instructions to cause said wireless device perform the actions of:
    powering-up as an access point in accordance with 802.11 standards;
    sending to a provisioning agent, a packet indicating that said wireless device requires provisioning for joining a first basic service set (BSS), wherein said first BSS is characterized by a first service set identifier (SSID) identifying said first BSS;
    associating with said provisioning agent;
    receiving provisioning parameters from said provisioning agent, wherein said provisioning parameters contain said first SSID, wherein said provisioning agent operates as a wireless station in accordance with 802.11 standards upon said associating and during said receiving, said wireless device operating as said access point during said associating and said receiving;
    storing said provisioning parameters in pre-specified memory locations in said wireless device;
    joining said first BSS based on said first SSID; and
    operating as a wireless station of said first basic service set (BSS) specified by said provisioning parameters after said storing.

15. The wireless device of claim 14, wherein said packet is a beacon message containing another service set identifier (SSID) of a pre-defined pattern.

16. The wireless device of claim 14, wherein said packet is a response to a probe request received from said provisioning agent.

17. The wireless device of claim 14, further comprising:
    communicating an identifier to said provisioning agent while being associated with said provisioning agent;
    storing said identifier in a non-volatile memory provided;

receiving a multicast packet requesting said identifier, said multicast packet being received during said operating as said wireless station of said first BSS; and sending said identifier as a response to said multicast packet, wherein said response confirms that said wireless device is configured to operate as said wireless station in said first BSS.

18. The wireless device of claim 17, wherein said multicast packet is according to multicast Domain Name Service/Domain Name Service-Service Discovery (mDNS/DNS-SD).

* * * * *